US012675771B2

(12) United States Patent
Kardan et al.

(10) Patent No.: US 12,675,771 B2
(45) Date of Patent: Jul. 7, 2026

(54) SYSTEM FOR ONLINE INTERACTION WITH CONTENT

(71) Applicant: Curatio Networks Incorporated, Vancouver (CA)

(72) Inventors: Samad Kardan, Edmonton (CA); Nima Kaviani, San Francisco, CA (US); Lynda Brown-Ganzert, Kelowna (CA); Alireza Davoodi, Burnaby (CA)

(73) Assignee: Curatio Networks Incorporated, Vancouver (CA)

( * ) Notice: Subject to any disclaimer, the term of this patent is extended or adjusted under 35 U.S.C. 154(b) by 913 days.

(21) Appl. No.: 17/048,805

(22) PCT Filed: Apr. 18, 2019

(86) PCT No.: PCT/CA2019/050488
§ 371 (c)(1),
(2) Date: Oct. 19, 2020

(87) PCT Pub. No.: WO2019/200485
PCT Pub. Date: Oct. 24, 2019

(65) Prior Publication Data
US 2021/0241155 A1      Aug. 5, 2021

Related U.S. Application Data

(60) Provisional application No. 62/659,389, filed on Apr. 18, 2018.

(51) Int. Cl.
*G06N 7/01*          (2023.01)
*G06Q 10/40*        (2026.01)
(52) U.S. Cl.
CPC .............. *G06N 7/01* (2023.01); *G06Q 10/40* (2026.01)

(58) Field of Classification Search
CPC ........ G06N 7/01; G06Q 50/01; G06Q 10/101; G09B 19/00; G16H 10/20; G16H 20/00; G16H 50/20; H04L 51/52
See application file for complete search history.

(56) References Cited

U.S. PATENT DOCUMENTS 8,666,909 B2      3/2014   Pinckney
9,123,022 B2      9/2015   Skarin
(Continued)

OTHER PUBLICATIONS

ISR & Written Opinion issued on Jul. 29, 2019 on corresponding PCT International Application No. PCT/CA2019/050488. (25 Pages).
(Continued)

*Primary Examiner* — Kc Chen
(74) *Attorney, Agent, or Firm* — Hayes Soloway PC

(57) ABSTRACT

Systems and methods relating to an online system for allowing interactions between online users. The system continuously tracks each user's interactions with different types and categories of content as well as with other users. Based partially on each user's tracked interactions, a probability based model of preferences, interests, and needs is created for each user. The probability based model is then used to predict a user's compatibility with other users and to recommend content. Based on predicted compatibilities, communities and groups of users are recommended to each user. To account for changing user profiles, each user's profile is periodically assessed against the profiles of other users for compatibility. Similarities in interests, preferences, and needs between users, as well as peer rankings, are taken into account when assessing compatibility between users and user groups and communities.

20 Claims, 11 Drawing Sheets

(56) References Cited

U.S. PATENT DOCUMENTS

| | | | |
|---|---|---|---|
| 9,558,277 B2 | 1/2017 | Pappas | |
| 2012/0150888 A1* | 6/2012 | Hyatt | G06F 16/335 |
| | | | 707/758 |
| 2013/0196297 A1* | 8/2013 | Anwar | G16H 40/67 |
| | | | 434/236 |
| 2014/0143250 A1 | 5/2014 | Martin | |
| 2014/0236953 A1 | 8/2014 | Rapaport | |
| 2014/0257851 A1 | 9/2014 | Walker | |
| 2015/0006261 A1 | 1/2015 | Gutman | |
| 2015/0186491 A1* | 7/2015 | Zukerman | G06F 16/337 |
| | | | 707/740 |
| 2015/0186532 A1* | 7/2015 | Agarwal | G06F 16/9538 |
| | | | 707/736 |
| 2015/0269488 A1 | 9/2015 | Galai | |
| 2016/0231891 A1 | 8/2016 | Vandermolen | |
| 2016/0342902 A1 | 11/2016 | Pinckney | |
| 2017/0344541 A1 | 11/2017 | Haeusler | |

OTHER PUBLICATIONS

EP Communication issued on Nov. 26, 2020 on corresponding European Application No. 19788858.9. (3 Pages).

\* cited by examiner

SYSTEM FOR ONLINE INTERACTION WITH CONTENT

TECHNICAL FIELD

The present invention relates to online platforms for interactions between users. More specifically, the present invention relates to an online platform that provides curated content to users, recommends groups to users, and recommends content to users based on user provided input as well as a user's changing profile. The user's profile is ever changing and is affected by the type, frequency, and target of the user's interactions with content as well as other users.

BACKGROUND

The rise of social networking websites has opened up social interactions. An individual's location is no longer a barrier to contacting and connecting with others. However, while current social networking sites such as Facebook allow individuals to connect, they currently do not make recommendations based on a user's changing interests. Current social networking websites make recommendations between individuals based on common friends or acquaintances but not on shared interests and not on shared common interests. As well, current social networking sites assume that, once a user identifies an interest (for instance, by "liking" a post or page), the user remains interested in that topic until they actively renounce it (by, for instance, returning to the page and "unliking" it).

Based on the above, there is therefore a need for systems and methods which mitigate if not overcome the shortcomings of the prior art.

SUMMARY

The present invention relates to online content and communications management systems. More specifically, the present invention provides systems and methods relating to an online system for allowing interactions between online users. An online system includes a content personalization module, a user model management module, a user assessment and recommendation module, a user interaction module, and a private social Support network module. The system continuously tracks each user's interactions with different types and categories of content as well as with other users. Based partially on each user's tracked interactions, a probability based model of preferences, interests, and needs is created for each user. The probability based model is then used to predict a user's compatibility with other users and to recommend content. Based on predicted compatibilities, communities and groups of users are recommended to each user. To account for changing user profiles, each user's profile is periodically assessed against the profiles of other users for compatibility. Similarities in interests, preferences, and needs between users, as well as peer rankings, are taken into account when assessing compatibility between users and user groups and communities.

In a first aspect, the present invention provides a system for personalizing online content to users, the system comprising:

a document database containing a plurality of documents, said documents being accessible by said users, each document of said plurality of documents being tagged with at least one topic to which said document relates, said content comprising at least said plurality of documents;

a content personalization and recommendation module for managing and recommending said documents in said document database;

a user model module for managing profiles for said users;

a user assessment and recommendation module for assessing and recommending the compatible users or groups of compatible users to each other.

a user private social network module;

wherein said user assessment and recommendation module periodically assesses each user profile against all other user profiles; and said user assessment and recommendation and recommendation module determines similarities between users to determine if specific users are compatible with other specific users.

In a second aspect, the present invention provides a system for specifying compatible users and recommending users and groups of users to each other based on the mentioned compatibility a user model and recommendation module for assessing each user profile against other user profiles to determine compatibility with other users;

a user interaction module for tracking user interactions with said content on said system, said content comprising at least said plurality of documents;

wherein user interactions with said content cause changes to specific user profiles; and said user assessment and recommendation module periodically assesses each user profile against all other user profiles.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
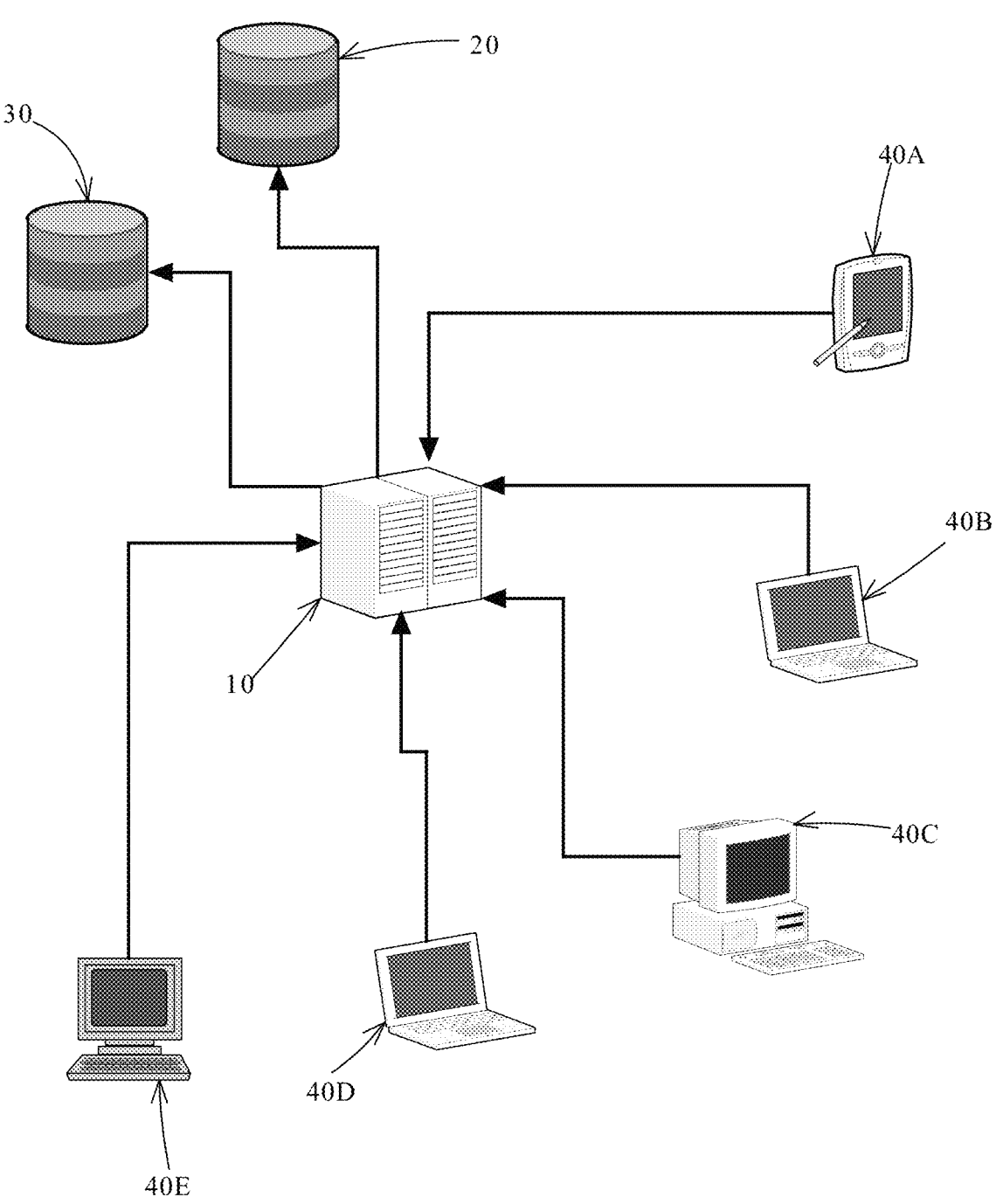
FIG. 1 is a block diagram of an environment in which the invention may be used.

Referring to FIG. 1, a block diagram of an environment using the invention is illustrated. As can be seen, a server 10 is coupled to two databases 20, 30. The devices of multiple users 40A-40E are in communication with the server 10. The various users are able to communicate with each other, either directly or indirectly, through the server 10. Direct communications between users may take the form of online real-time chat windows or chat rooms, real time videoconferencing, or other means for real-time or near real-time communications between users. Indirect communications may take the form of emails, bulletin board posts, private messaging, or other communication methods that do not require real time or near real time interactions between users. As can be seen, the devices of the multiple users may take the form of desktop computers, laptop or notebook computers, smartphones, tablets, or any other suitable data processing device for connecting to and interacting with an online server.

Figure 2:
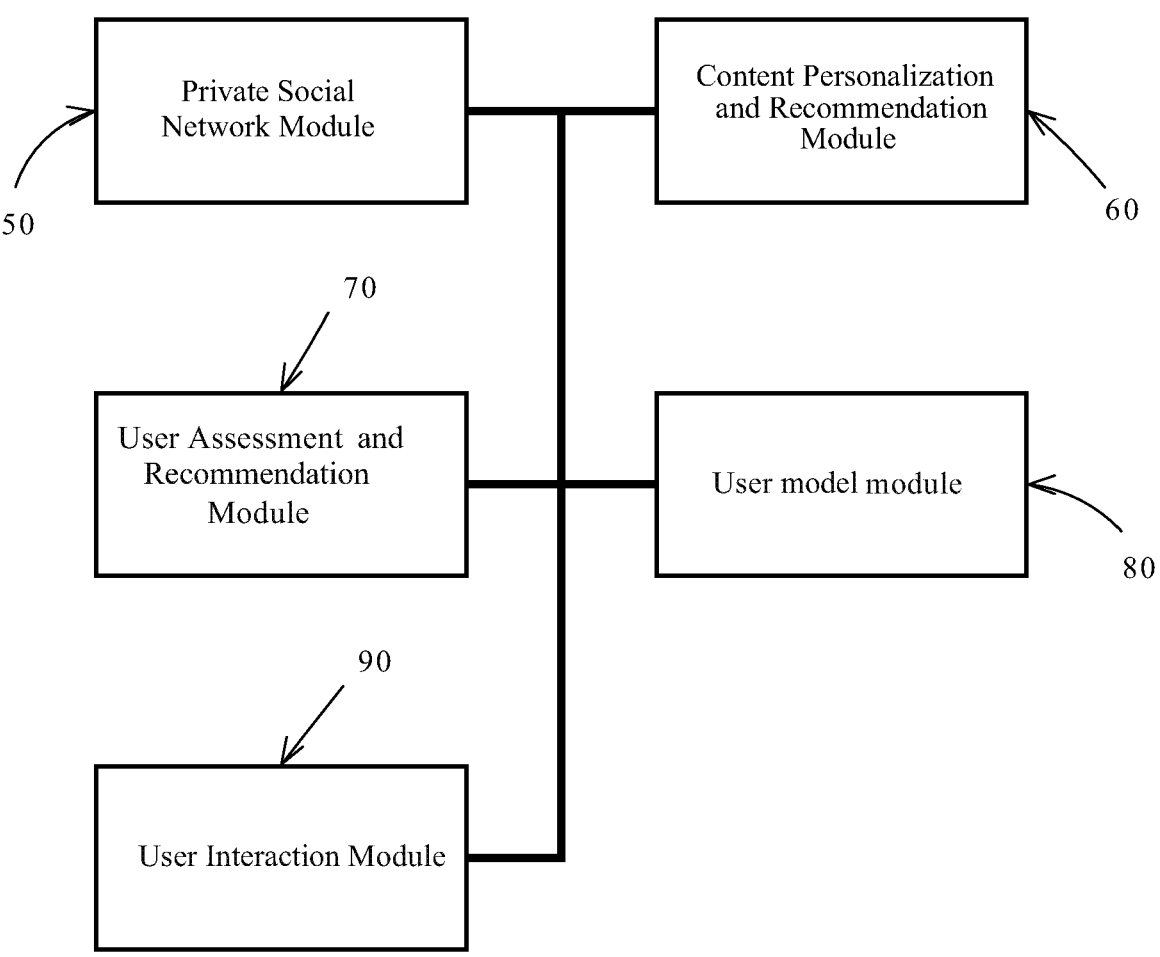
FIG. 2 is a block diagram detailing the modules in a system according to one aspect of the invention.

Referring to FIG. 2, a block diagram of a system according to one aspect of the invention is illustrated. The modules which form part of the system are illustrated. A private social network module 50 is in communication with a content personalization and recommendation module 60, a user assessment and recommendation module 70, a user model module 80, and a user interaction module 90. The functions and capabilities of these modules are as detailed below.

As may be imagined, the system provides users with recommendations for content that may be relevant to the user's interests or concerns. Using the user's own interactions with content and/or with other users, the system can predict the user's interests, preferences, and concerns. These predictions are then used to select content that the user may find interesting or relevant. As well, these predictions are used to select other users or communities among the users that are relevant to the user's own interests or preferences. The system tracks the topics and keywords of content that the user has interacted with to determine the user's interests and preferences. In addition, the system may track the user's interactions with other users and the user's own actions to further refine the user's predicted preferences.

In addition to the above, the system also makes recommendations to users about potential friends and/or communities and/or groups of people that the user may find helpful/relevant.

Private Social Network Module

The private social network module 50 is the initial module executed by the system. The private social network module provides an incoming user with a user interface for logging in and provides a gateway for the logged in user to access the rest of the system.

Communications submodules that allow for real-time and near real-time communications between users may also form part of the private social network module. These submodules may include submodules that allow for chat rooms, direct online or instant messaging between users, direct video links between specific users, and group chat sessions. As well, other communications submodules that relate to less time sensitive communications between users may also form part of the private social network module. Such communications submodules may allow for both direct and indirect non-real time communications such as, for example, email, bulletin board-type postings, and public/private profile postings.

Content Personalization Module

The content personalization module deals with the acquisition, topic tagging, topic determination, filtering, content storage, and content approval for the system.

The content for use by the system may come from disparate sources. Some may be user generated while others may come from mainstream media including news articles, bulletins, information *circulars*, and other informational digital content. In addition to these sources, other sources of digital content, including freely available news feeds, audio and video feeds (e.g. Youtube™), blogs, vlogs, and others may be used.

Figure 3A:
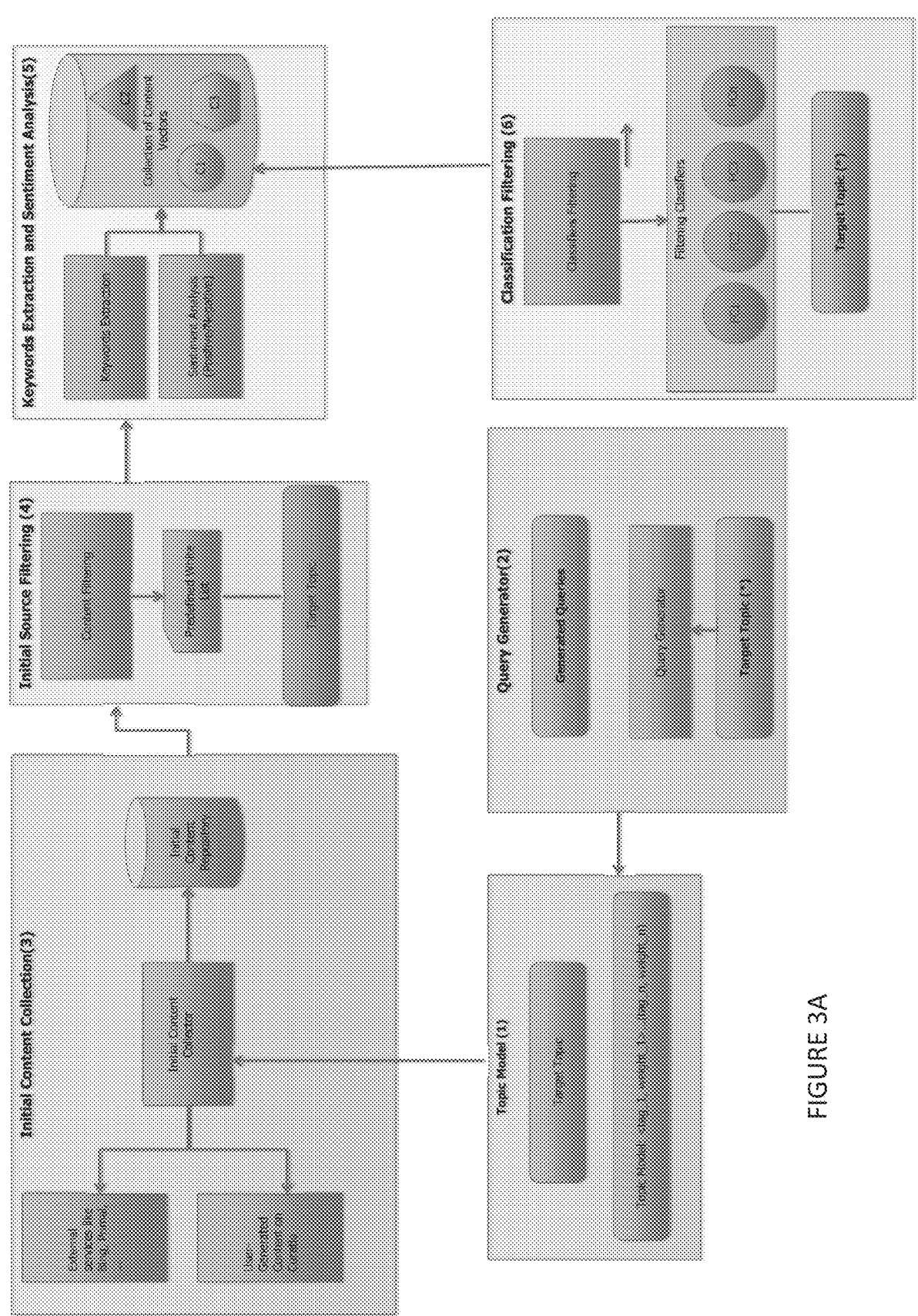
FIG. 3A is part of a block diagram of a process and its components for processing content for the system detailed in FIG. 2.
Figure 3B:
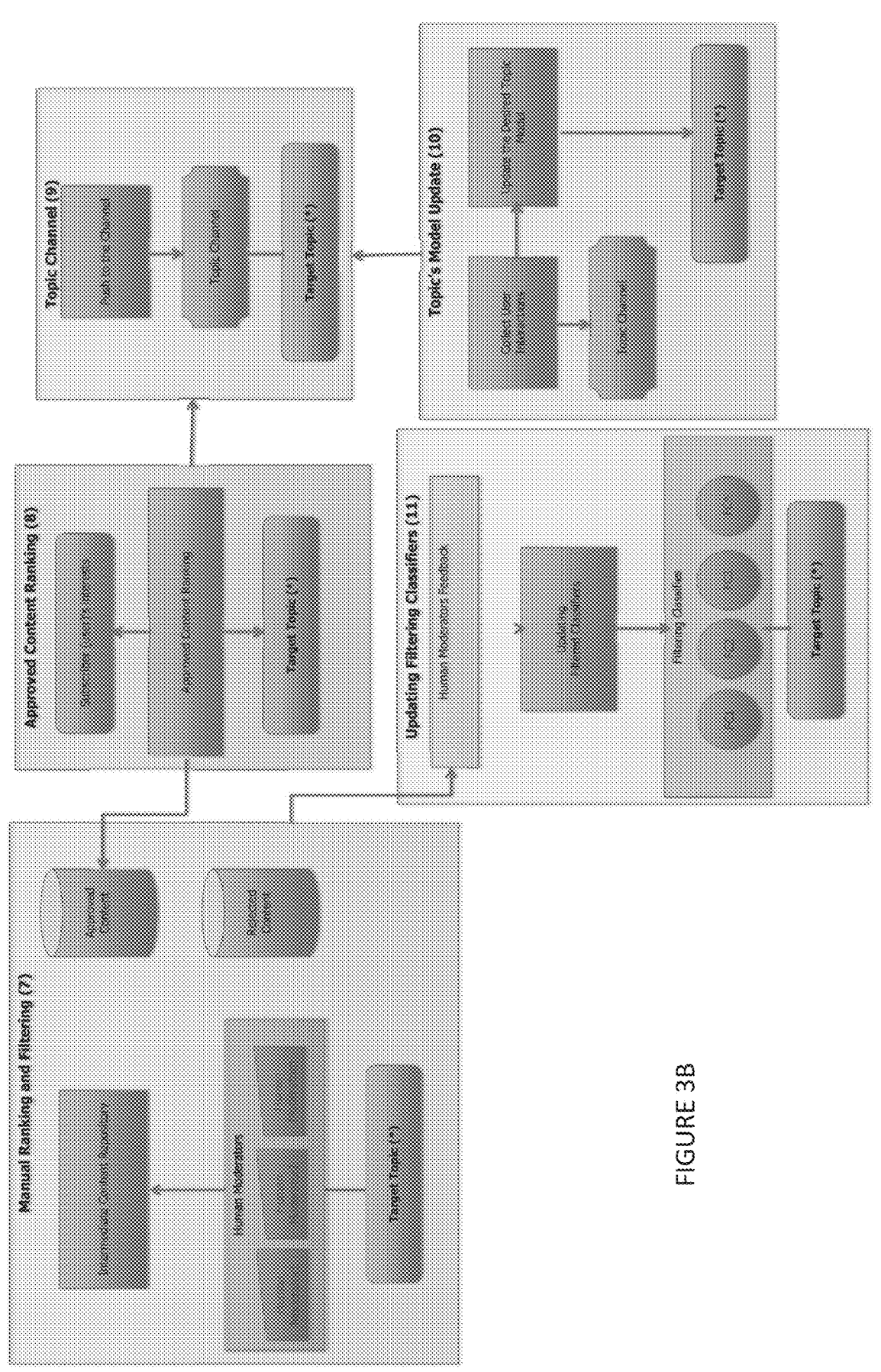
FIG. 3B is a second half of the block diagram illustrated in FIG. 3A.

Referring to FIGS. 3A and 3B, the process and components for sourcing and classifying content to be used in the system can be summarized as follows:

Target Topic (Block 1): Each topic is initially defined by a vector of tuple of tag and weight. The tags and weights can be initially specified by human experts. In one implementation, the initial weights of all tags are the same.

Query Generator (Block 2): The generator uses the Target Topic model and generates queries. The generated queries will then be used by the Initial Content Collector.

Initial Content Collection (Block 3): The Initial Content Collector is given a number of predefined initial tags and keywords based on the desired topics and subscribes to or queries two sources of contents: External Services (including external engines such as such as Bing, Primal, etc.) and user-generated content on the system. The content that the module receives is then pushed to or stored in an initial content repository.

Initial Source Filtering (Block 4): The content collected through the Initial Content Collection component is used as input to an Initial Source Filtering component. This component uses a predefined whitelist that contains approved sources of information for the target community or topic. The filtering process disregards or discards any content which does not come from a source identified in the predefined whitelist.

Keywords Extraction and Sentiment Analysis (Block 5): This component has two sub-components: a) Keywords Extraction sub-component and b) a Sentiment Analysis sub-component. These sub-components use the IBM Watson Developer Cloud for their jobs and the combined output of the two sub-components is a vector for each piece of content. The vector consists of a tuple of keywords and weights as well as semantic scores for that piece of content. Non-text content (e.g., photos or videos) is processed based on associated textual tags and metadata.

Classification Filtering (Block 6): The Classifiers Filtering process uses several classifiers trained for each topic. The content vectors from the Keyword Extraction and Sentiment Analysis block are classified by each of these classifiers. Each of these classifiers represents an aspect of interest for the content (e.g., relevance, scam, adverse event, etc.).

The output of this process is content that has been labeled as a candidate for publishing. This labeled content is then added and stored in the Intermediate Content Repository.

Manual Ranking and Filtering (Block 7): This optional step uses several humans trained for each topic who review the labeled content and label them as "Approved" or "Rejected". If this step in the process is used, the content which has been manually approved is used by the Approved Content Ranking component. For the "Rejected Content", the human moderator will provide reasons. If this step is not taken, an automated approval/rejection process may be used that may take advantage of artificial intelligence and/or may use a more aggressive classification filtering process. The content that does not pass the filtering process is rejected while the content that is allowed will be approved.

Approved Content Ranking (Block 8): This step in the process ranks the approved content using the topic model as well as a user's interests. The highest ranked content will be pushed to a topic channel.

Topic Channel (Block 9): The topic channel is a news and content feed that presents the approved and ranked content to the subscribing user. The content is pushed to the channel and is presented to the user.

Topic Model Update (Block 10): User interactions with the published content will be collected and used to update the topic model. As will be discussed below, the user interactions with the content will be tracked. Based on the user reaction to the content, the topic model will be adjusted to ensure more relevant content is provided to the user.

Updating Filtering Classifiers (Block 11): As another optional step in the process, human moderator feedback and comments can be used to update the filtering classifiers. This ensures that the filtering classifiers will deliver more relevant content to the users.

As noted above, content that is classified as being related to a specific topic is pushed to and/or presented to the user using the topic channel. Since the topic channel is a news and content feed to which a user subscribes to, any new content that relates to the topic is presented to the user without the need for any effort on the user's part. However, for topics that might be related to a specific topic as well as other topics that the user might not be subscribed to, as will be explained below, a user's interest in these topics can be tracked. As an example, if a user views content from a specific topic channel that he or she subscribes to, this content might also be related to another topic that the user might be unaware of. By viewing this content, the user's probable interest in this other topic is tracked and, if the user's interest is high enough, other content related to this other topic may be recommended to the user. Such a recommendation may prompt the user to subscribe to a topic channel relating to the other topic.

It should also be noted that, for a health and wellness themed implementation of the system, content recommendations may be made to the user based on the user's medical condition. For such an implementation, the user may be prompted to enter his or her medical condition and any maladies he or she may be suffering from. The system may then take this user input data and generate recommendations as to content, friends, communities, and/or groups based on the medical conditions detailed by the user.

User Model Module

The user model module handles tasks relating to a user's profile including editing the profile, adjusting the profile, tagging the profile for assessment, and creating or deleting a profile.

For a new user, the user model module provides a user interface for creating the new user's online profile on the system. To this end, the user profile may include a user intake submodule that provides a new user with a user interface for entering a new user's information. This includes prompting the new user for basic data regarding the user, including the user's name, email address, password for the system, and preferred username while online in the system. Other less basic information may also be collected from the user including gender, height, weight, eye color, hair color, etc., etc. Of course, the amount of data collected from the user may depend on the implementation of the system.

Figure 4:
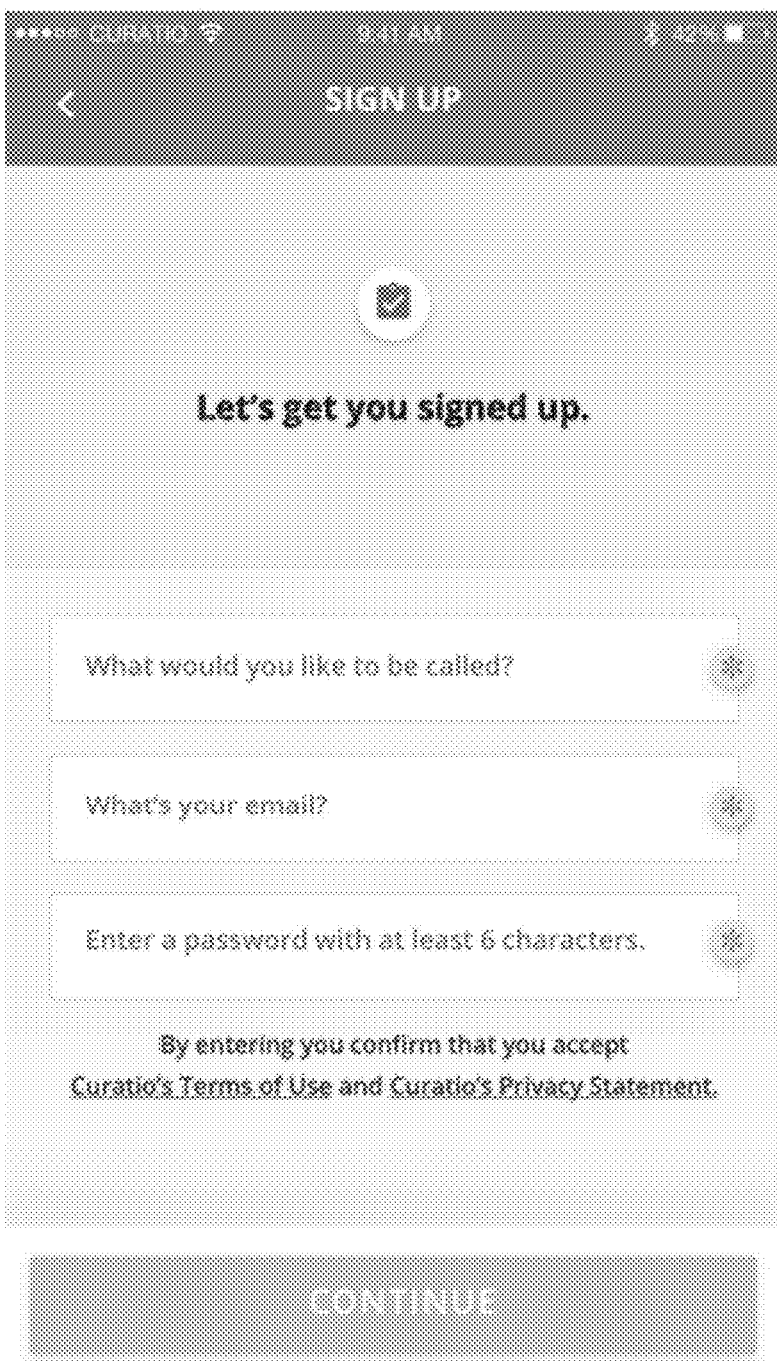
FIG. 4 is a user interface for use in signing up new users to a system illustrated in FIG. 2.
Figure 5:
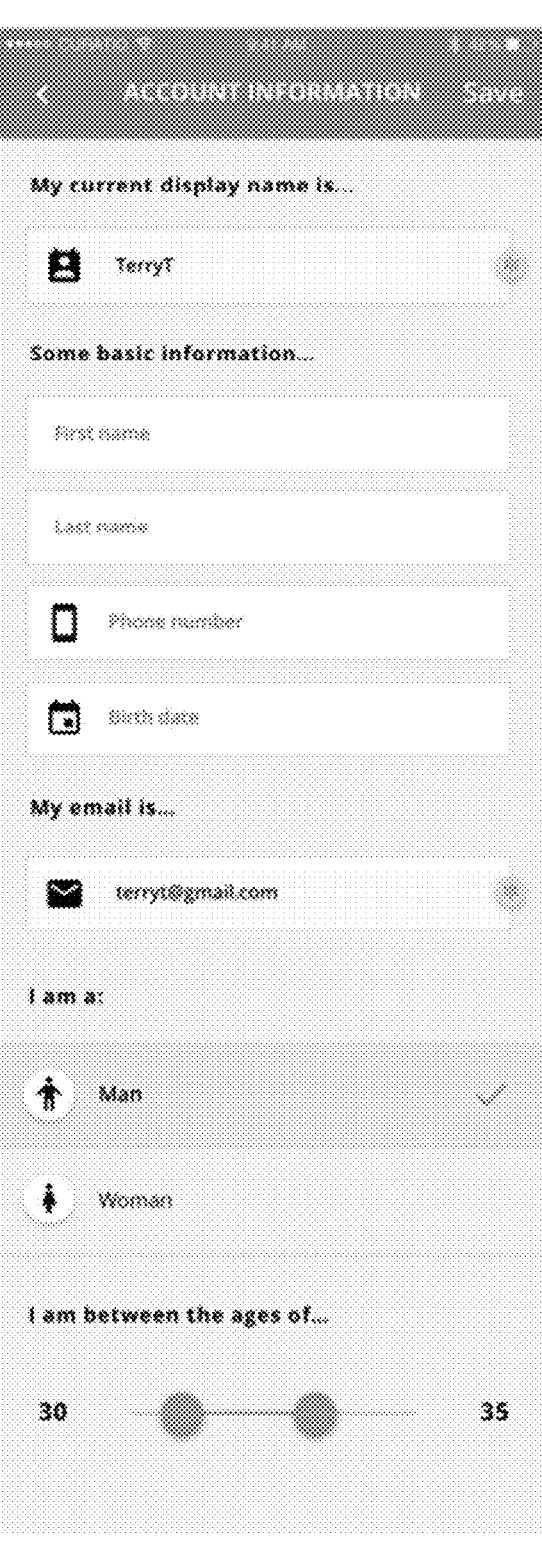
FIG. 5 is a further user interface for receiving new users to a system illustrated in FIG. 2.

Referring to FIG. 4, a signup page is illustrated. The signup page prompts the new user for a preferred username, the user's email, and a preferred password. Referring to FIG. 5, a further sign up page prompts the new user for some basic information.

In implementations that are centered on the user's health and wellness, the new user may be prompted to enter the user's medical conditions, any symptoms he or she may be experiencing, as well as the user's physical characteristics. To assist the user, a menu of potential physical symptoms may be presented to the user. The user can then select which symptoms he or she may have. In addition, the user may be prompted to enter his or her test results including blood sugar readings, blood pressure readings, pulse rate, and heart rate. The user may also be prompted to enter what his or her medications are and the dosages and frequency that the medications are entered. Other ways of inputting a user's symptoms or conditions may also be used including gesture based data entry.

In another implementation, users are provided with a series of diagrams that are representative of health and mood of the user. The system can then provide a menu for the possible symptoms (e.g. pain, tremors, skin condition, rash, etc., etc.). This way, the user can easily quantify not only the location of the symptoms of his or her condition but also what those symptoms are.

Figure 6:
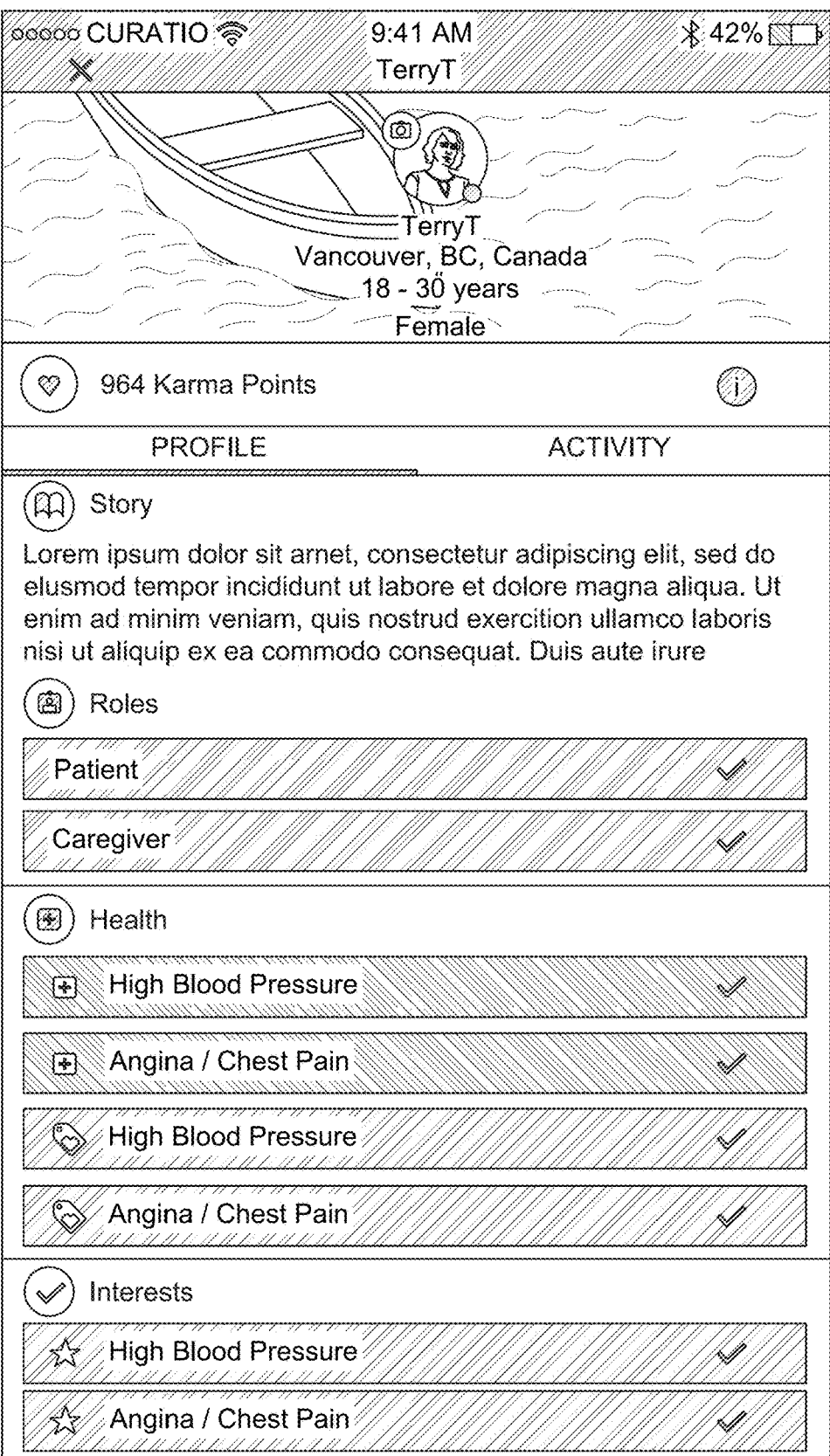
FIG. 6 is a user interface detailing a user's profile for a system as illustrated in FIG. 2.

Referring to FIG. 6, a detailed profile of a user for a health and wellness themed system is illustrated. As can be seen, the profile indicates the user's preferred roles to be presented to other users, the user's health condition (including any illnesses and conditions the user may have), and the user's interests.

It should be noted that the user model module creates and maintains two profiles per user: a user data profile and a predictive model profile. The user data profile for a user contains data gathered from the user, including the user's name, username, height, weight, etc., etc. The user data profile, for health and wellness centered implementations, may also store the user's health conditions, any maladies the user may have, any symptoms entered by the user as well as what medications are being taken, their dosages, and the frequency of the medications. The predictive model profile, on the other hand, includes data that the system predicts as being applicable to that particular user. As an example, the predictive model profile would include the user's preferences, interests, needs, and expectations. The predictive model profile is created and updated based on user interactions with content on the system as well as interactions with other users. As will be explained below, any user interaction that indicates a preference or an interest by the user in a specific topic or subject causes a change in the user's profile.

It should further be noted that, as part of the predictive model profile, the system may be configured such that each user has a number of counters or indicators that track that user's interactions with content tagged for a specific topic. Preferably, each user's profile has a counter for each topic listed and available on the system. Every time a user accesses content tagged with a specific topic, the counter for that topic in the user's predictive model profile is incremented. As an example, if a user accesses an article relating to a recommended diabetic's diet and which has been tagged with the topics (or keywords) diabetes, diet, blood sugar, and insulin, then the counters for those topics and keywords on that user's predictive model profile are incremented. The values in each user profile's topic/keyword counters determine that user's interests and preference. Thus, if a user profile has 100 topic counters (corresponding to 100 different topics) and the counters for topics A, B, and C have the highest count out of that profile's counters, then topics A, B, and C are part of that user's greatest or most relevant interests.

While the above explanation assumes that the increments to each topic's counter are whole numbers, decimals may also be used to thereby weight the effect of each interaction.

As part of this concept, instead of incrementing each topic by 1 every time a user interacts with content relating to or tagged with a specific topic, other considerations may be taken to properly weigh that user's interest in the specific topic. Instead of just counting the number of interactions that a user has with each topic, other considerations such as the recency of each interaction and the "quality" of each interaction may be used.

To weigh the recency of each interaction, the count for a specific topic may be "aged" based on how recent the user's interaction is with content tagged with that specific topic. As an example, a topic's counter value may lose 10% of its value for every month that a user has not interacted with any content for that topic. Thus, if topic A has a count of 100 and the user has not interacted with content for topic A in a month, then the count for topic A is reduced to 90. If the user has not interacted with content for topic A in two months, then, for the first month, topic A's count is reduced from 100 to 90. For the second month, the count is reduced to 81 as the 10% reduction is taken from the count value of 90. Or, alternatively, a specific percentage of the count can be deducted for every month during which the user has not interacted with content with a given topic. For each topic count for a user, a date data field can be provided with the date of the user's last interaction with content tagged with the topic. This way, the amount of time since the user's last interaction with content tagged with the topic can easily be determined. Of course, once a user has interacted with content that relates to a specific topic, the counter for that topic (as well as the counter for other topics that the content may related to) is updated as well as the date of the user's last interaction with that topic.

To give weight to the "quality" of a user's interaction with specific content, the user's interaction can be assessed to determine if the user's interaction was sufficient to show the user's interest in the content's topic. As an example, if the content is an article, it can be determined if the user scrolled to the end of the article. Or, if the content includes a video clip, it can be determined if the user viewed the entirety of the clip. Similarly, the user's interaction with the content can be timed—if the user's interaction is longer than a predetermined length of time, then the user is probably interested in the topic. The quality of the interaction can be weighed properly by assigning specific percentages to the increment assigned to the specific topic count. As an example, instead of incrementing the topic count by a whole number, the increment can be the percentage of the article that the user scrolled through or the percentage of the video clip that the user viewed. Or, if the assessment of the user's interaction is time based, then a full increment is given to the topic count if the user's interaction is longer than a given predetermined amount of time. If the user's interaction is shorter than the predetermined amount of time, then less than a full increment is given to the topic count. As an example, if the user's interaction with the content (e.g. a news article) lasts less than the predetermined amount of time, then only a half count or a half increment is given to the topic count (e.g. incrementing a topic count from 5 to 5.5). On the other hand, if the user's interaction lasts longer than the predetermined amount of time, a full increment can be given (e.g. incrementing a topic count from 5 to 6).

Regarding user interactions with other users, these interactions may also increment a user's topic count. As an example, in the event user A is interacting with user B using the system, such as by way of an online chat room, an email message, or instant messaging, the system tracks such interactions. The user's entries or contributions to the interaction are tracked and, if specific keywords or topics are entered by the user, then the topic count for that keyword or topic may be incremented. This ensures that the user's interest in that topic is not simply tracked but noted.

Of course, for ease of implementation, a full increment can simply be given to a topic count if the user interacts with content of a given topic.

Regarding a user's friends, the predictive model profile also includes a list of users that the user has indicated as a friend and who have also indicated that the user is a friend as well. Thus, the user profile indicates not only the user's interests but also the system users whom the user considers as a friend or who is relevant and/or useful to the user. Of course, the addition of a friend may also be taken into account when determining a user's interests and preferences. Adding a friend who has multiple interests common to the user can be used as a basis to increment the topic count for those topics of interest common to the user and the added friend. The effect of this may be adjusted so that not all common topics of interests will have their topic counts incremented. As an example, if user A has added user B as a friend and A and B each have the topic "blood sugar" in their top 10 highest count topics (i.e. A and B have "blood sugar" as a common topic of highest interest), then the topic count for "blood sugar" for both users will be implemented. The addition of a friend who has a similar high interest in a particular topic indicates a reinforcement of the user's interest in that topic. Limiting the effect of adding friends only to a user's main or highest interest topic ensures that other topics that might be of passing interest are not incremented. As an example, if user A has a low topic count for the topic of "progeria" and user A has added user B as a friend and user B has a similar low topic count for the topic of "progeria", then neither of their topic counts for this subject will be incremented.

Similar to the addition of friends, whenever a user joins a community or a defined group of users with a specific topic or area of interest (e.g. "diabetes" or "controlling your blood sugar"), this may increment a user's topic count for specific topics. As an example, if a user joins a defined community of users with the community having a defined interest in hypertension, then that user's topic count for the topic hypertension should be incremented. Joining a group of individuals all of whom have an interest about a specific topic or subject indicates a high level of interest in that topic or subject. As such, this high level of interest should be reflected in the user's profile.

For ease of implementation and to ease the computational burden on the system, the user model module may tag or flag each user profile that has been changed so that the system may use this flag or tag for multiple purposes. Since the user model module has to change topic counts every time a user interacts with content or with other users, the user model module can also set the flag for that user's profile once a topic count has been updated. Similarly, any change that a user makes to his or her profile (e.g. updating a stated preference/interest, entering a blood sugar reading, entering a blood pressure reading, or entering a new symptom or condition) would cause the user model module to set the flag.

It should be clear that the user model module updates the user model and other users. In one implementation, the predictive model profile uses a set of random variables and their corresponding probability distributions. The initial distribution for each random variable is set through publicly available data or data collected over multiple studies performed. In this health and wellness based implementation, the probabilistic model profile uses three probabilistic models:

a) Need/Expectation Probabilistic Model, b) Preferences Probabilistic Model and c) Interests Probabilistic Model.

Need/Expectation Probabilistic Model: This probabilistic model represents the system's estimate of what a user is looking for in the system. The system for this implementation is an open platform which offers varying functionalities such as peer support, online communication, content, health programs, disease management tools and others. Each user joining the system is assigned a distribution over a vector that represents the user's needs and expectation from the system.

Preferences Probabilistic Model: The probabilistic model represents the types of people the user prefers to connect to. For instance, the model shows the probability the user would like to connect to people with specific age range, gender, location, and/or condition. For an implementation using this model, the system may track a user's friends and their qualities based on these categories in much the same way that the system tracks a user's interests.

Interests Probabilistic Model: This model represents information about a user's medical and non-medical interests and experience. The system learns a set of tags over time based on a user's interactions with content and other users and indicates the likelihood of relevance of each of these tags to the user.

In addition to the user's interests, preferences, and identity, the user model module may also track a user's preferred role. In one implementation, the system identifies the probability distribution over the discrete random variable "Role", based on the user's social graph (i.e. connections and friends) and the user's provided information. The possible values are: Active, Inactive, Star, Supporter, Influencer, Experienced, Recently Diagnosed, Regular. Of course, this set of roles may be expanded based on the configuration and implementation of the system.

From the above description and discussion, the user model module deals with tasks involving the creation of and the changing of data in a user's profile. The predictive model profile for a user includes data detailing topics and keywords that relate to content interacted with by the user. The topic count for each of these topics and keywords determine the level of interest that the user has about each and every one of the available topics. In addition, the user profile includes a list of the user's friends. In addition to the topic count, the list of the user's friends, communities, and groups to which the user belongs may be used to determine the user's interests and preferences.

User Interaction Module

To ensure that a user's interactions with both content and other users are properly reflected in that user's model, all of that user's interactions are tracked and/or logged.

In one implementation, all interactions are logged into one tracking file for each user. The details of each interaction is stored in the tracking file including an identification of the content interacted with, data indicating the quality of the interaction, other users interacted with, and data regarding the interaction with the other users. This data regarding the other users may include transcripts of chats, messages, and other communications. Once the user's session is over (i.e. the user has logged off), the user interaction module then processes the tracking file for that user. This means that, for each piece of content interacted with by that now logged off user, the content identification is extracted and the various topics and keywords associated with that content is identified. The topic count for these topics and keywords are then incremented as noted above, taking into account the various weighting methods implemented. As well, the interactions with other users are assessed. The transcripts and messages are mined for keywords and topics and, again, the topic count for these keywords and topics are incremented in the user's profile. Once the tracking data has been extracted and processed from the user's tracking file, the tracking file is then deleted.

In another implementation, instead of storing a user's interactions for later processing, the user interaction module can process each interaction as it ends or as it is occurring. As an example, the user interaction module can determine the keywords and topics associated with a piece of content that a user has just interacted with The user interaction module can then communicate with the user model module to adjust the relevant topic counts to reflect the user's interaction with the content. Similarly, a chat session or an instant message sent from one user to another can be tracked as messages are sent. If a user uses a term that corresponds to a specific topic, then the count for that topic can be incremented at that point. This way, while a user's interactions are tracked, no record of those interactions, temporary or otherwise, is created.

It should also be clear that the user interaction module not only tracks the user's interactions with content and with other users. The user interaction module also tracks a user's friends that have been added or deleted. As well, it allows the tracking of communities that a user may have joined or left. As noted above, the addition of friends and the joining of communities can change and/or adjust a user's interests and/or preferences.

The user interaction module allows the system to determine, in near real-time or soon after a user's session ends, the effect of that user's interactions on the user's interests and/or preferences.

User Assessment and Recommendation Module

The user assessment and recommendation module assesses a user's profile against the profiles of other users to determine the compatibility between the users. Depending on the configuration of the system and the thrust of the system, the compatibility may be with a view towards friendship, romance, or support for health issues. Once compatibility has been determined, the result may then be used to recommend people or groups to users. Compatibility is bilateral: thus, if user A is compatible with user B, user B will be compatible with user A. User B may then be recommended to user A, and vice versa. For ease of implementation, compatibility between users or between users and groups or communities of users may be assessed in a numerical fashion with a compatibility score. The various assessment methods noted below can be used to add, weight, or subtract from a compatibility score.

It should be clear that compatibility may be assessed using different criteria. In one implementation, the profile of user A and, more specifically, the interests and preferences of user A as noted in user A's profile, is compared with the profile of each and every other user of the system to determine if there is sufficient commonality between the profiles. If there is sufficient commonality between, for example, user A and user B, the system may then determine that user A and B are compatible.

It should be noted that compatibility may be scored or graded with a higher score indicating higher compatibility or commonality between the profiles. Thus, if user A had 10 specific topics which are of highest interest (i.e. user A's profile had the highest topic counts for these 10 specific topics) and if user B's 10 topics of highest interest coincide with 7 of these 10 topics from user A, then the system may grade their compatibility as being 70% compatible. To assist the system when comparing different user profiles, instead of comparing all of the topic counts between two profiles, only the topic counts with the highest values may be compared. Thus, if there are, for example, 500 different topics listed in the system, instead of comparing 500 topic counts in user A's profile with the 500 topic counts in user B's profile, the user assessment and recommendation module only compares the top 10 or even top 5 highest valued topic counts in the two user profiles.

It should be clear that the user assessment and recommendation module may use criteria other than a user's topics of highest interest. As an example, the user assessment and recommendation module may assess a user's circle of friends (i.e. other users who are listed as a user's "friends") to determine if a user has common friends with other users. The user assessment and recommendation module may then grade or score compatibility based on the number of common friends. As an example, if user A had 100 listed friends and user B had 50 listed friends and there are 35 users who are in both lists, then the user assessment and recommendation module may score compatibility based on common friends as 35% for user A and 70% for user B (i.e. what percentage of friends does A have in common with B). The bilateral compatibility based on common friends, then, may be computed as the average of user A and user B's common-friend compatibility (in this case, 52.5%).

Further, the total bilateral compatibility may be assessed as a combination of compatibility metrics. The total bilateral compatibility may be computed based on both users' topics of highest interest and their common-friend compatibility metric, as well as any other such metric or comparison factor.

As an alternative to the above, instead of just comparing each user's directly connected friends, two users being compared may have their friend and/or communities network compared. Two networks being compared can have their nodes compared and, based on how many nodes are common to the two networks, the two networks, and hence the users, are compatible. The level of node commonality that leads to a conclusion of compatibility may be system and/or implementation specific. As an example, if user A and user B are being compared for compatibility, if the predetermined level of commonality needed for compatibility is set to 20%, then if 20% (or greater) of user A's network nodes is in common with the network nodes of user B, then users A and B are considered compatible. It should be clear that commonality in network nodes is not limited to the first level of network nodes (i.e. a user's direct friends on the system). The commonality in network nodes can extend to two if not three degrees of separation. Thus, if user P is a friend of users N and W and user N is a friend of user A and user W is a friend of user B, then user P is a common node to the networks of users A and B. User P can thus be seen as having two degrees of separation from both user A and B. These second if not third degree separated nodes can be used to further determine compatibility between two users. Of course, the value of these common nodes can be weighted so that their effect on a compatibility conclusion may be heightened or reduced.

Assessments for user or group compatibility may also be made based on a user's rating or assessment of other users. The concept is that if two users who assess a third user in a similar manner, then these two users are probably compatible or are at least similar to one another. Thus, if users A and B have user C independently recommended to both as a potential compatible friend, then their assessment of user C will have an impact on their compatibility with one another. If user A and B both accept user C as a friend, then users A and B are probably compatible with each other and their compatibility score can be increased accordingly. However, if only user A accepted user C as a friend, then users A and B may not be compatible and their compatibility scores may be adjusted accordingly.

The above concept can be extended to take into account the number of users commonly recommended to two users being assessed against each other. As an example, if 10 users were independently recommended to users A and B, then the number of the 10 recommended potential friends that were both accepted may have an effect on the compatibility score between users A and B. If 6 of the 10 recommended potential friends were both accepted by users A and B, then chances are, users A and B are compatible and their compatibility score is to be increased. However, if only 2 or 3 of the 10 potential friends were both accepted by users A and B, then their compatibility score may not be increased or may even be decreased.

Compatibility can also be assessed based on responses by others to the two users being compared. As an example, if users A and B are both independently recommended to user C as potentially compatible friends (i.e. user A is recommended to user C and user B is also recommended to user C), user C's response to these recommendations may be used as an indication of compatibility between users A and B. Thus, if user C accepts both users A and B as friends, then, chances are users A and B are compatible with one another and their compatibility score can be increased accordingly. However, if user C only accepted user A as a recommended friend and not user B, then users A and B may not be compatible with each other. As such, their compatibility score may be reduced accordingly.

The above may be extended further by taking into account not just one or two users to whom two users were recommended as friends. An aggregate of the responses towards the two users may be used to increase or decrease the compatibility score between two users. Thus, if users A and B were independently recommended to 100 other users as potential friends, the aggregate response may be determinative as to whether the compatibility score between users A and B is increased or not. As an example, if, of the 100 users, only 20 users added both users A and B, then these two users may not be compatible and their compatibility score may not be increased. However, if 65-75 users out of the 100 added both users A and B as friends, then the compatibility score for users A and B should be increased. It should be noted that this example is for illustrative purposes only and one implementation uses a probabilistic Bayesian model with a predefined prior.

It should be clear that the user assessment and recommendation module not only assesses each user's profile against the profiles of other users but also makes recommendations based on these assessments. The assessments can, as noted above, result in a compatibility score between two users or between a user and a group of users. A recommendation can be made between two users if their compatibility score meets or exceeds a given predetermined value. Of course, this given predetermined value can be system or implementation specific. As well, the given predetermined value can be different if two users are being assessed for compatibility as opposed to the compatibility between a user and a community or group of users. For some implementations, a higher compatibility score may be needed between individuals than for groups before a recommendation can be made.

The compatibility score can be an aggregate of the various scores resulting from the various compatibility assessments made by the user assessment and recommendation module between two users. Of course, depending on the implementation and the desired end result by the system designers, different assessment methods and their results can be given greater or lesser weight in the final compatibility score by selectively weighting the different assessment method results. If the compatibility score meets or exceeds a predetermined level, then a recommendation is made to the two users.

Figure 7:
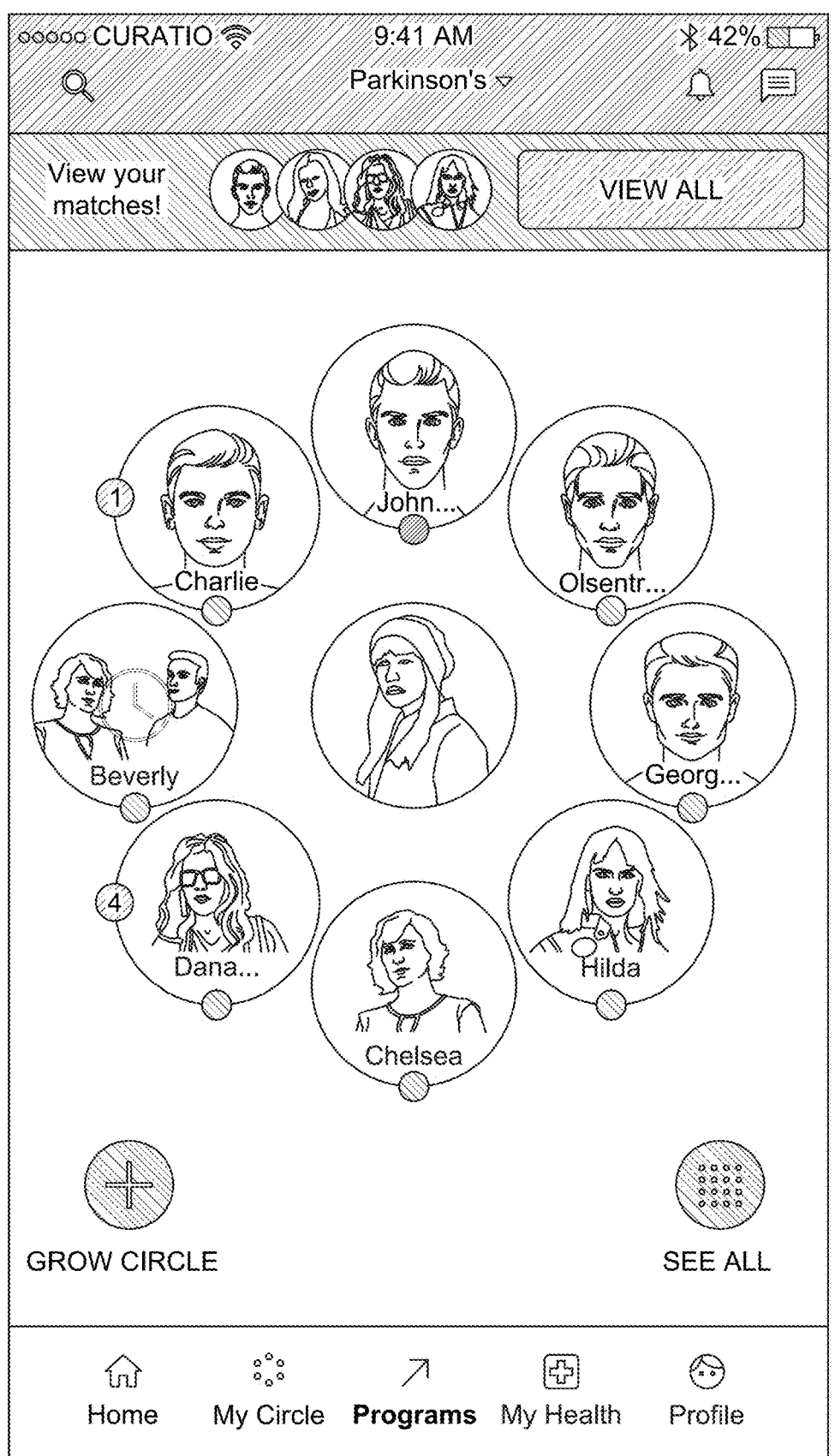
FIG. 7 is a user interface showing the members of a group or community to which a user belongs in a system as illustrated in FIG. 2.

In one implementation, to recommend a community or a group of users to a specific user, the specific user's profile may be assessed against the various members of that community or group. If the specific user is determined to be compatible with at least most of the members of the group or community, then the specific user is recommended to the various members of the group or community and vice versa. Referring to FIG. 7, a user interface screen illustrating the members of a group or community to which a user belongs is illustrated. As can be seen, the user's profile picture is in the center of the group and an indication of the group's main interest is noted at the top of the interface screen.

Once compatibility scores have been calculated or determined for each user against all other users, for each user, the users with whom he or she is most compatible with are ranked by other of compatibility. This ranked list is then presented to each user as a list of recommended potential friends. Thus, if user A has the highest compatibility score with users B, C, and D, then the list of compatible potential friends for user A would have users B, C, and D at the top of the list.

For ease of implementation, a user would not be assessed against users to whom he or she is already friends with.

For this system, since a user's profile changes with potentially every interaction with both content and users, each user would need to be continuously re-assessed against other users whenever that user's profile changes. After all, a user's interests and preferences may change over time and, accordingly, his or her needs in terms of support and friendship may similarly change. To this end, the user assessment and recommendation module may be configured to reassess each user profile which has been changed continuously. As noted above, whenever the user model module changes something in a user's profile, that profile is tagged or flagged as being changed. The user assessment and recommendation module may use that flag to determine which user profiles to reassess against other user profiles. The system may be configured to perform a reassessment of flagged or tagged user profiles once every day or once every given predetermined amount of time (e.g. once a day, once every 12 hours, etc., etc.). This ensures that any user profile that has been changed will have its data assessed for compatibility or similarity against all the other user profiles. Of course, as noted above, these changed user profiles will not need to be reassessed against the profiles of those to whom the user is already connected or friends with.

It should be clear from the above discussion that, in the context of this document, compatibility is predicated on similarity between users. Thus, the more similar two users are, then the more compatible they are and thus the more likely they are to be friends or to have similar interests.

Figure 8:
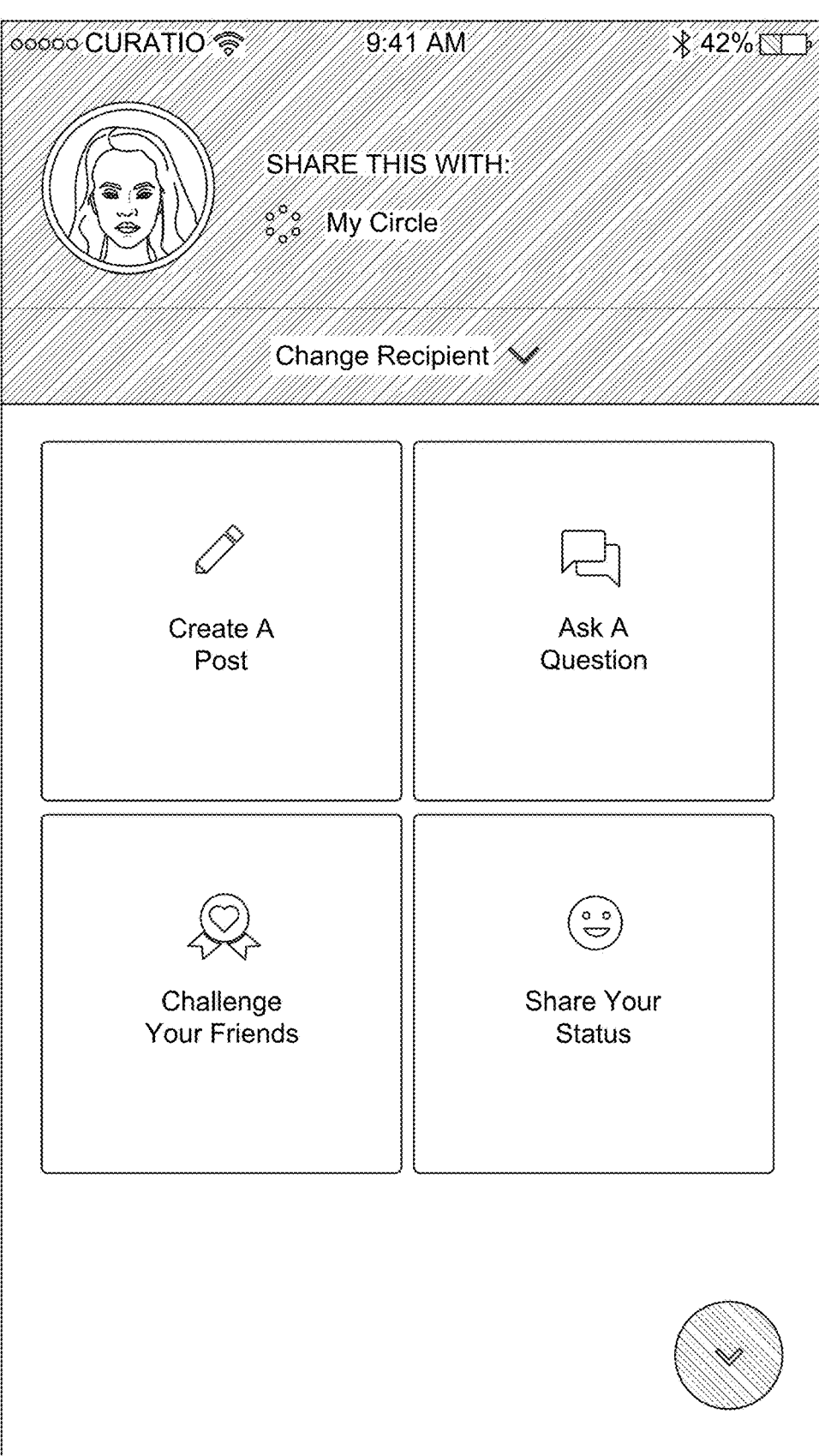
FIG. 8 is a user interface for a system illustrated in FIG. 2 which allows the user to communicate with other users in the system.

As noted above, the system's private social network module may provide the user with interfaces that allow the user to communicate, directly or indirectly, with other system users. Referring to FIG. 8, such a user interface is illustrated. As can be seen, the user interface allows the user to post on a bulletin board type system, pose a question to a group or community, and share the user's status to the rest of the group or community.

Figure 9:
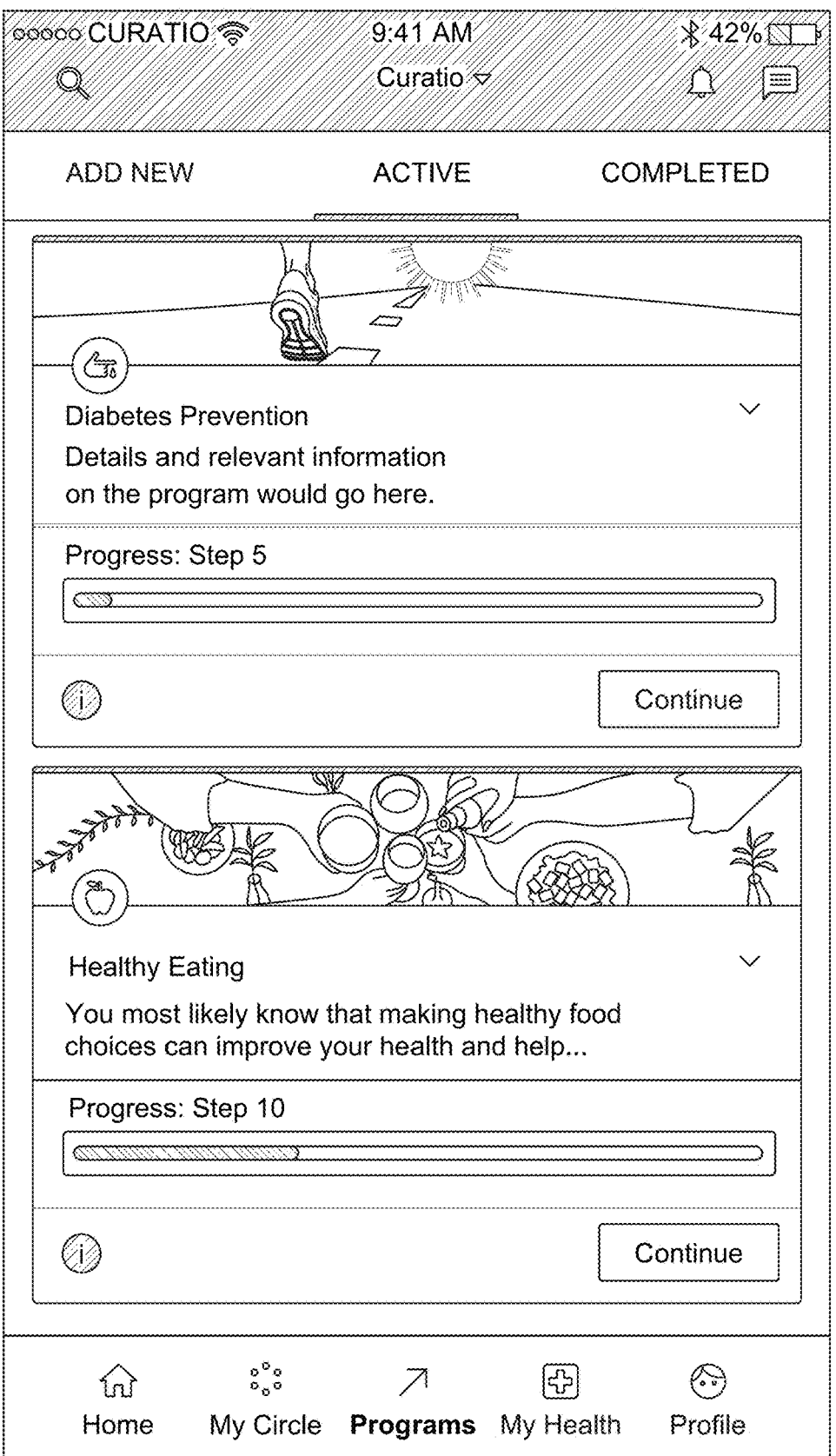
FIG. 9 illustrates a user interface detailing programs and interests for a user.

Referring to FIG. 9, a listing of two programs offered through the system is illustrated. As can be seen, these programs also refer to two interests that the user has.

Figure 10:
FIG. 10 is a user interface for a system as illustrated in FIG. 2 which indicates a user-entered blood glucose level for the system.

Referring to FIG. 10, a user interface for entering data regarding the user's health and well-being is illustrated. As can be seen, the interface provides a visual cue as to the subject of the data. In this case, the user is entering a blood sugar or glucose level and this is represented by the drop of blood near the hand icon.

It should also be noted that, in addition to tracking and logging a user's interests, social network, and preferences, the system may also directly gather information from the user. The system may log information about user activities such as duration of visits, pages visited, resources used, likes, comments, program participation, bookmarks, content creations, content sharing, and direct messaging.

In one health and wellness based implementation of the system, one of the main objectives is the building of an exclusive and personalized support group for every user joining the system. Each user is provided with a recommendation to a group of people with different models and/or roles so that the support the user receives is maximized at the time of joining. This also ensures that, over time, the support provided evolves with the user's changing interests and preferences. It is reasonably expected that the support a patient with chronic condition requires, could significantly evolve over time. So the aim is to recommend people with different models as the needs change. A user's exclusive and personalized support group consists of people with different predefined roles mentioned above.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A system for providing online content to users, the system comprising:

a document database containing a plurality of documents, said plurality of documents being accessible by said users, and each document of said plurality of documents being tagged with at least one topic to which said document relates, wherein said plurality of documents comprises at least some of said online content;

processing circuitry and at least one memory unit, the at least one memory unit storing computer-executable instructions, the processing circuitry configured to:

manage said plurality of documents in said document database;

recommend at least some of said plurality of documents in said document database to at least one of said users;

manage user profiles for said users;

automatically assess said user profiles, in real-time, to determine compatible users or groups of compatible users;

automatically recommend, in real-time, said compatible users or groups of compatible users to each other; and facilitate interactions via a private social network between individual ones of said compatible users, between said individual ones of said compatible users with said groups of said compatible users, and between individual users and said online content, wherein said compatible users or groups of said compatible users are determined based on direct comparison of counters in said user profiles;

each of said counters relates to a topic and each of said counters in each user's user profile is incremented as said each user interacts with content related to said topic, said processing circuitry being further configured to set a flag on said specific one of said user profiles responsive to one of said counters being incremented;

a compatibility score for a first specific user and a second specific user is determined by:

automatically comparing a subset of first counters in a first profile of said first specific user with a subset of second counters in a second profile of said second specific user in real-time, wherein said subset of first counters comprises counters with highest count values in said first profile and said subset of second counters comprises counters with highest count values in said second profile, such that said subset of first counters indicates topics of greatest interest to said first specific user and said subset of second counters indicates topics of greatest interest to said second specific user;

automatically determining a number of topics in common between said subset of first counters and said subset of second counters in real-time;

automatically, in real-time, determining a compatibility score based on said number of topics in common; and said first specific user is determined to be compatible with said second specific user when said compatibility score meets a predetermined threshold; and an amount of an increment for said counter in respect of a specific interaction of said specific user with said content is based on a quality of said specific interaction of said user with said content, said quality being determined based on at least one of: a duration of said specific interaction and a completeness of said specific interaction.

2. The system according to claim 1, wherein said processing circuitry determines compatibility of said first specific user and said second specific user based at least partially on rankings by other users.

3. The system according to claim 1, wherein said processing circuitry determines compatibility of said first specific user and said second specific user based at least partially on user interests as indicated in said user profiles.

4. The system according to claim 1, wherein at least one of said user profiles includes data relating to a medical condition of one of said users associated with said at least one of said user profiles.

5. The system according to claim 1, wherein said processing circuitry is further configured to detect a presence of said flag on said specific user's profile;

responsive to detecting said flag, reassess said compatibility score for said specific user and at least one other user.

6. The system according to claim 5, wherein said processing circuitry is further configured to reassess said compatibility score at predetermined intervals.

7. The system according to claim 1, wherein said system gathers information directly from said users regarding user activities.

8. The system according to claim 7, wherein said user activities include at least one of: duration of visits to pages in said system, pages visited, resources used, user-indicated likes, user-entered comments, user participation in at least one program accessed through said system, user-entered bookmarks, user-created content, user-shared content, and user-generated direct messages to other users.

9. The system according to claim 1, wherein data regarding said first specific user is gathered by said system using a user interface, and wherein said data relates to said first specific user's health and well-being.

10. The system according to claim 9, wherein said user interface includes a visual cue regarding a subject of said data being gathered from said first specific user.

11. The system according to claim 1, wherein said counter ages based on a recency of said user interactions with said content.

12. The system according to claim 1, wherein at least one of said first counters is also incremented when said first specific user designates another user as a friend, said at least one of said first counters relating to a topic of common interest between said first specific user and said another user.

13. The system according to claim 12, wherein said at least one of first counters is incremented upon the designation of said another user as a friend only when said topic of common interest is a topic of highest interest for both said first specific user and said another user.

14. A system for use in interacting with content and other users, the system comprising:

a document database containing a plurality of documents, each document of said plurality of documents being tagged with at least one topic, said plurality of documents comprising at least some of said content;

processing circuitry and at least one memory unit, the at least one memory unit storing computer-executable instructions, the processing circuitry configured to:

manage user profiles for said users;

automatically, in real-time, assess said user profiles to determine compatible users or groups of compatible users;

automatically, in real-time, recommend said compatible users or groups of compatible users to each other; and automatically, in real-time, track user interactions with said content, wherein each specific user of said users of said system is associated with a specific one of said user profiles;

interactions of a specific user with said content cause at least one change to said specific one of said user profiles, said processing circuitry being further configured to set a flag on said specific one of said user profiles when said at least one change is made;

said specific one of said user profiles details said user's interest in a topic by way of a counter, said counter relating to said topic and said counter being incremented as said specific user interacts with content related to said topic;

a compatibility score for a first specific user and a second specific user is determined by:

automatically, in real-time, comparing a subset of first counters in a first profile of said first specific user with a subset of second counters in a second profile of said second specific user, wherein said subset of first counters comprises counters with highest count values in said first profile and said subset of second counters comprises counters with highest count values in said second profile, such that said subset of first counters indicates topics of greatest interest to said first specific user and said subset of second counters indicates topics of greatest interest to said second specific user;

automatically, in real-time, determining a number of topics in common between said subset of first counters and said subset of second counters;

automatically, in real-time, determining a compatibility score based on said number of topics in common;

said first specific user is determined to be compatible with said second specific user when said compatibility score meets a predetermined threshold; and an amount of an increment for said counter in respect of a specific interaction of said specific user with said content is based on a quality of said specific interaction of said user with said content, said quality being determined based on at least one of: a duration of said specific interaction and a completeness of said specific interaction.

15. The system according to claim 14, wherein said counter ages based on a recency of said user interactions with said content.

16. The system according to claim 14, wherein said processing circuitry is further configured to detect a presence of said flag on said specific user's profile; and responsive to detecting said flag, reassess said compatibility score for said specific user and at least one other user.

17. The system according to claim 16, wherein said processing circuitry is further configured to reassess said compatibility score at predetermined intervals.

18. A health and wellness-themed system for providing online content to users based on the users' health conditions, the health-and-wellness-themed system comprising:

a document database containing a plurality of documents, said documents being accessible by said users, each document of said plurality of documents being tagged with at least one topic to which said document relates, said online content comprising at least said plurality of documents;

processing circuitry and at least one memory unit, the at least one memory unit storing computer-executable instructions, the processing circuitry configured to:

manage user profiles for said users;

automatically, in real-time, assess said user profiles to determine compatible users or groups of compatible users;

automatically, in real-time, recommend said compatible users or groups of compatible users to each other; and automatically, in real-time, track user interactions with said content, wherein said processing circuitry is further configured to:

automatically, in real-time, periodically assesses each user profile against all other user profiles;

automatically, in real-time, set a flag for the user's profile when the user makes a change to their user profile;

automatically, in real-time, detect a presence of said flag on said user's profile; and responsive to detecting said flag, assess said user's profile against other user profiles, wherein said assessing comprises determining similarities between users to determine if specific users are compatible with other specific users, and wherein:

said user profile for each individual user includes data related to: said individual user's health conditions, any maladies of said individual user, any symptoms entered by said individual user, any medications taken by said individual user and dosage and frequency data for said medications, and each of said user profiles is configured to contain a number of counters, each of said counters being associated with a specific topic and each of said counters tracking said one of said users' interactions with content tagged for its associated specific topic, wherein a count for any specific topic is aged based on a recency of said interactions, at least one of said documents is recommended to a specific user based on:

filtering said documents using a predefined whitelist to thereby obtain a subset of filtered documents;

extracting keywords from said filtered documents and performing sentiment analysis on said filtered documents to thereby output a content vector for each of said filtered documents;

classifying content vectors using classifiers trained for each topic, wherein each of said classifiers corresponds to an aspect of interest for the content;

labeling each of said filtered documents based on outcomes of the classifying, such that at least one of said filtered documents is labeled as an approved candidate for publishing; and ranking the at least one approved candidate for publishing using a topic model for said at least one topic to which said at least one of said filtered documents relates and wherein said ranking uses said specific user's interests.

19. The health-and-wellness-themed system according to claim 18, wherein said processing circuitry is further configured to detect a presence of said flag on said specific user's profile; and responsive to detecting said flag, reassess said compatibility score for said specific user and at least one other user.

20. The health-and-wellness-themed system according to claim 19, wherein said processing circuitry is further configured to reassess said compatibility score at predetermined intervals.

\* \* \* \* \*